United States Patent
Rimmer et al.

(10) Patent No.: US 10,533,746 B2
(45) Date of Patent: Jan. 14, 2020

(54) COMBUSTION CHAMBER WITH FENCES FOR DIRECTING COOLING FLOW

(71) Applicant: ROLLS-ROYCE plc, London (GB)

(72) Inventors: John E Rimmer, Loughborough (GB); Michael A Macquisten, Derby (GB); Stephen J Mills, Ashbourne (GB); Jochen Rupp, Burton-on-Trent (GB); Lynn I Steward, Derby (GB); Murthy V Ravikanti, Derby (GB)

(73) Assignee: ROLLS-ROYCE plc, London (GB)

( * ) Notice: Subject to any disclaimer, the term of this patent is extended or adjusted under 35 U.S.C. 154(b) by 337 days.

(21) Appl. No.: 15/359,472

(22) Filed: Nov. 22, 2016

(65) Prior Publication Data
US 2017/0176005 A1    Jun. 22, 2017

(30) Foreign Application Priority Data
Dec. 17, 2015  (GB) .................................. 1522273.0

(51) Int. Cl.
*F02C 1/00*  (2006.01)
*F23R 3/00*  (2006.01)
*F02C 7/12*  (2006.01)

(52) U.S. Cl.
CPC ................. *F23R 3/002* (2013.01); *F02C 7/12* (2013.01); *F05D 2220/32* (2013.01); *F05D 2240/35* (2013.01)

(58) Field of Classification Search
CPC ..................................................... F23R 3/002
See application file for complete search history.

(56) References Cited

U.S. PATENT DOCUMENTS 3,706,203 A * 12/1972 Goldberg .................. F23R 3/08
 60/757
4,302,941 A * 12/1981 DuBell .................. F23R 3/002
 60/757

(Continued)

FOREIGN PATENT DOCUMENTS

EP   1 098 141 A1   5/2001
EP   1 662 201 A2   5/2006
(Continued)

OTHER PUBLICATIONS

Jun. 17, 2016 Search Report issued in British Patent Application No. 1522273.0.

*Primary Examiner* — Gerald L Sung
(74) *Attorney, Agent, or Firm* — Oliff PLC

(57) ABSTRACT

A gas turbine engine combustion chamber arrangement includes an annular outer wall and annular inner wall including an upstream and a downstream row of tiles. The downstream end of each tile in the upstream row of tiles has a rail extending towards and sealing with the outer wall and a lip extending in a downstream direction towards the tiles in the downstream row of tiles. The outer wall has a row of apertures to direct coolant onto the lips of the tiles in the upstream row of tiles. The downstream end of each tile in the upstream row of tiles has a plurality of fences extending in a downstream direction from the rail and each fence extends from the outer surface of the lip towards the outer wall. The row of apertures in the annular outer wall is arranged to direct coolant onto the lip between two circumferentially adjacent fences.

19 Claims, 5 Drawing Sheets

(56) References Cited

U.S. PATENT DOCUMENTS

| | | | | |
|---|---|---|---|---|
| 4,446,693 A * | 5/1984 | Pidcock | ................ | F23R 3/002 60/757 |
| 4,773,227 A * | 9/1988 | Chabis | ................ | F23R 3/002 60/752 |
| 5,799,491 A | 9/1998 | Bell et al. | | |
| 6,029,455 A * | 2/2000 | Sandelis | ................ | F23R 3/002 60/752 |
| 6,408,628 B1 * | 6/2002 | Pidcock | ................ | F23R 3/002 60/752 |
| 8,726,626 B2 | 5/2014 | Spooner | | |
| 2001/0029738 A1 | 10/2001 | Pidcock et al. | | |
| 2002/0124572 A1 | 9/2002 | Pidcock et al. | | |
| 2003/0213250 A1 * | 11/2003 | Pacheco-Tougas | ..... | F23R 3/002 60/752 |
| 2007/0193216 A1 * | 8/2007 | Woolford | ................ | F23R 3/002 52/782.1 |
| 2010/0229563 A1 * | 9/2010 | Woolford | ................ | F23R 3/002 60/752 |
| 2010/0251722 A1 * | 10/2010 | Woolford | ................ | F23R 3/002 60/755 |
| 2011/0185739 A1 | 8/2011 | Bronson et al. | | |
| 2014/0216042 A1 * | 8/2014 | Hanson | ................ | F23R 3/06 60/754 |
| 2014/0216044 A1 * | 8/2014 | Erbas-Sen | ................ | F23R 3/002 60/772 |
| 2015/0300645 A1 * | 10/2015 | Jopp | ................ | F23R 3/002 60/753 |
| 2016/0281987 A1 * | 9/2016 | Torkaman | ................ | F23R 3/002 |

FOREIGN PATENT DOCUMENTS

| | | | | |
|---|---|---|---|---|
| EP | 1813868 A2 * | 8/2007 | ............ | F23R 3/002 |
| EP | 2 846 097 A2 | 3/2015 | | |
| GB | 2 353 589 A | 2/2001 | | |
| GB | 2 356 042 A | 5/2001 | | |
| GB | 2 432 902 A | 6/2007 | | |

* cited by examiner

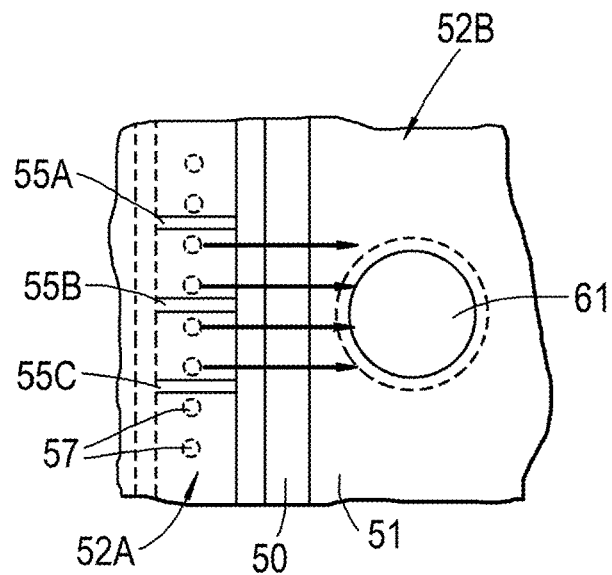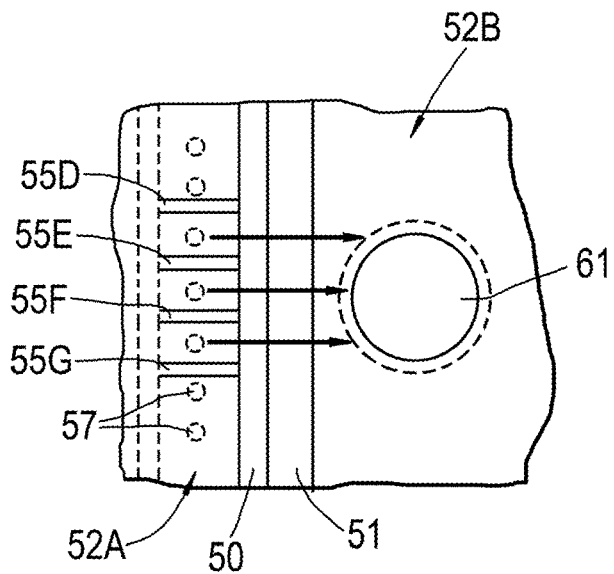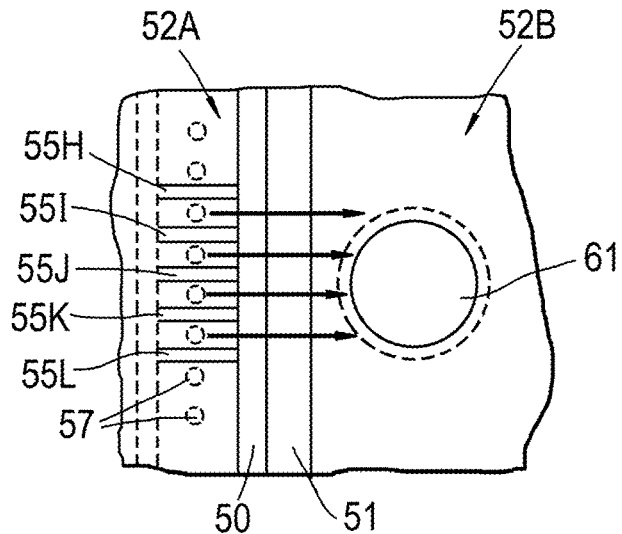

COMBUSTION CHAMBER WITH FENCES FOR DIRECTING COOLING FLOW

The present disclosure relates to a combustion chamber and in particular to a gas turbine engine combustion chamber.

One known type of combustion chamber comprises one or more walls each of which comprises a double, or dual, wall structure. A dual wall structure comprises an annular outer wall and an annular inner wall spaced radially from the annular outer wall to define a chamber. The annular outer wall has a plurality of impingement apertures to supply coolant into the chamber and the annular inner wall has a plurality of effusion apertures to supply coolant from the chamber over an inner surface of the annular inner wall to provide a film of coolant on the inner surface of the annular inner wall.

The annular inner wall comprises a plurality of rows of circumferentially arranged tiles. These rows of tiles produce a discontinuity, or a number of discontinuities, in the inner surface of the annular inner wall that has a detrimental effect on the film of coolant on the inner surface of the annular inner wall. The downstream ends of the tiles have lips which extend axially towards but are spaced from the upstream ends of the adjacent row of tiles and the annular outer wall has one or more rows of apertures to direct coolant onto the lips and then to assist in re-forming a film of coolant over the inner surface of the upstream ends of the adjacent row of tiles. The coolant flowing from the lips of the tiles has reduced momentum, low momentum, and reduced cooling effectiveness due to the coolant having provided impingement cooling of the lips of the tiles.

Rich burn combustion chambers require dilution ports to supply additional air into the combustion chamber to control emissions. The dilution ports comprise aligned apertures in the annular outer wall and the annular inner wall. The low momentum flow of coolant from the lips of the tiles combined with a local static pressure field upstream of the dilution ports may lead to ingress, or flow reversal, into the space between the lips of the tiles and the annular outer wall. Hence, this may lead to overheating, and a reduction in the working life, of the downstream ends of the tiles and the annular outer wall. The air flowing through the dilution ports has high momentum flow and disrupts the film of coolant flowing over the upstream ends of the adjacent row of tiles produced by the coolant flowing from the lips at the downstream ends of the row of tiles and causes the coolant flow to migrate circumferentially around the dilution ports leading to a region upstream of each dilution port which is devoid of a coolant film. Hence, this may lead to overheating, and a reduction in the working life, of the upstream ends of the tiles of the adjacent downstream row of tiles.

Accordingly the present disclosure seeks to provide a combustion chamber which reduces, or overcomes, the above mentioned problem.

According to a first aspect of the present disclosure there is provided a combustion chamber arrangement comprising an annular outer wall and an annular inner wall spaced from the annular outer wall, the annular inner wall comprising an upstream row of tiles and a downstream row of tiles, each row of tiles comprising a plurality of circumferentially arranged tiles, the downstream end of each tile in the upstream row of tiles having a rail extending from the downstream end of the tile towards and sealing with an inner surface of the annular outer wall and a lip extending in a downstream direction towards but spaced from the upstream ends of the tiles in the downstream row of tiles, the annular outer wall having at least one row of apertures to direct coolant onto the outer surfaces of the lips at the downstream ends of the tiles in the upstream row of tiles, the at least one row of apertures being arranged to supply the coolant to a chamber defined between the inner surface of the annular outer wall, the rails and the lips of the downstream ends of the tiles in the upstream row of tiles, the downstream end of at least one of the tiles in the upstream row of tiles having a plurality of circumferentially spaced fences extending in a downstream direction from the rail, each fence extending from the outer surface of the lip towards the inner surface of the annular wall and at least one of the apertures in the at least one row of apertures in the annular outer wall is arranged to direct coolant onto the lip between two circumferentially adjacent fences.

An upstream region of at least one of the tiles in the downstream row of tiles may have a dilution aperture or an igniter aperture and the at least one tile in the upstream row of tiles being arranged such that the dilution aperture or the igniter aperture is positioned circumferentially between two circumferentially adjacent fences at the downstream end of the at least one tile in the upstream row of tiles.

The at least one tile in the upstream row of tiles may be arranged such that the dilution aperture or the igniter aperture is positioned circumferentially midway between two circumferentially adjacent fences at the downstream end of the tile in the upstream row of tiles.

The circumferential distance between two circumferentially adjacent fences in the upstream row of tiles may be at least equal to the diameter of the dilution aperture in the downstream row of tiles.

The downstream end of a plurality of the tiles in the upstream row of tiles may have a plurality of circumferentially spaced fences extending in a downstream direction from the rail, each fence extending from the outer surface of the lip towards the inner surface of the annular wall and at least one of the apertures in the at least one row of apertures in the annular outer wall is arranged to direct coolant onto the lip between two circumferentially adjacent fences.

An upstream region of a plurality of the tiles in the downstream row of tiles may have a dilution aperture or an igniter aperture and each one of the plurality of tiles in the upstream row of tiles being arranged such that the dilution aperture or the igniter aperture of a respective one of the plurality of tiles in the downstream row of tiles is positioned circumferentially between two circumferentially adjacent fences at the downstream end of the respective one of the plurality of tiles in the upstream row of tiles.

Each one of the plurality of tiles in the upstream row of tiles may be arranged such that the dilution aperture or the igniter aperture of a respective one of the plurality of tiles is positioned circumferentially midway between two circumferentially adjacent fences at the downstream end of the respective one of the plurality of tiles in the upstream row of tiles.

The circumferential distance between two circumferentially adjacent fences in the upstream row of tiles may be at least equal to the diameter of the dilution aperture in the downstream row of tiles.

The downstream end of each of the tiles in the upstream row of tiles may have a plurality of circumferentially spaced fences extending in a downstream direction from the rail, each fence extending from the outer surface of the lip towards the inner surface of the annular wall and at least one of the apertures in the at least one row of apertures in the annular outer wall is arranged to direct coolant onto the lip between two circumferentially adjacent fences.

A plurality of apertures in the at least one row of apertures in the annular outer wall may be arranged to direct coolant onto the lip between two circumferentially adjacent fences.

Each fence at the downstream ends of the tiles in the upstream row of tiles may be positioned circumferentially midway between two circumferentially adjacent dilution apertures at the upstream regions of the tiles in the downstream row of tiles and the number of fences at the downstream ends of the tiles in the upstream row of tiles is equal to the number of dilution apertures at the upstream regions of the in the intermediate row of tiles.

The, or each, dilution aperture at the upstream region of a tile in the downstream row of tiles may have three or more fences positioned immediately upstream of it at the downstream end of a tile in the upstream row of tiles.

The circumferential distance between the first and last fences in the upstream row of tiles may be at least equal to the diameter of the dilution aperture in the downstream row of tiles.

The circumferential distance between the first and last fences on the upstream row of tiles may be greater than the diameter of the dilution aperture in the intermediate row of tiles and the remaining fences are positioned at equal circumferential distances apart between the first and last fences.

The circumferential midway point between the first and last fences may be aligned circumferentially with the middle of the dilution aperture in the downstream row of tiles.

Each fence extending from the outer surface of the lip towards the inner surface of the annular wall may contact the inner surface of the outer wall.

Each fence extending in a downstream direction from the rail may extend the full length of the lip.

The, or each, fence may extend with a purely axial component and does not extend with a circumferential component.

The upstream end of each tile in the downstream row of tiles may have a rail extending from the upstream end of the tile towards and sealing with an inner surface of the annular outer wall.

The rail at the upstream end of each tile in the downstream row of tiles may extend in an upstream direction.

The combustion chamber may be an annular combustion chamber and the annular inner wall is spaced radially inwardly from the annular outer wall.

The combustion chamber may be an annular combustion chamber and the annular inner wall is spaced radially outwardly from the annular outer wall.

The combustion chamber may be a tubular combustion chamber and the annular inner wall is spaced radially inwardly from the annular outer wall.

The combustion chamber may be a gas turbine engine combustion chamber. According to a second aspect of the present disclosure there is provided a combustion chamber tile having a rail extending from a first surface of the tile at a first end of the tile, a lip extending from the first end of the tile, the first end of the tile having a plurality of laterally spaced fences extending from the rail, each fence extending from the first surface of the lip.

The tile may be parallelogram in shape in a plan view. The tile may be rectangular in shape in a plan view.

The tile has longitudinally spaced ends and laterally spaced edges.

The tile may be arcuate. The tile may be curved between its laterally spaced edges.

The tile may have a rail extending around the periphery of the first surface.

The first surface of the tile may be concave between its laterally spaced edges. The first surface of the tile may be convex between its laterally spaced edges.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which:

FIG. 8 is an alternative view in the direction of arrow B in FIG. 5.

FIG. 9 is another view in the direction of arrow B in FIG. 5.

FIG. 10 is an additional view in the direction of arrow B in FIG. 5.

Figure 1:
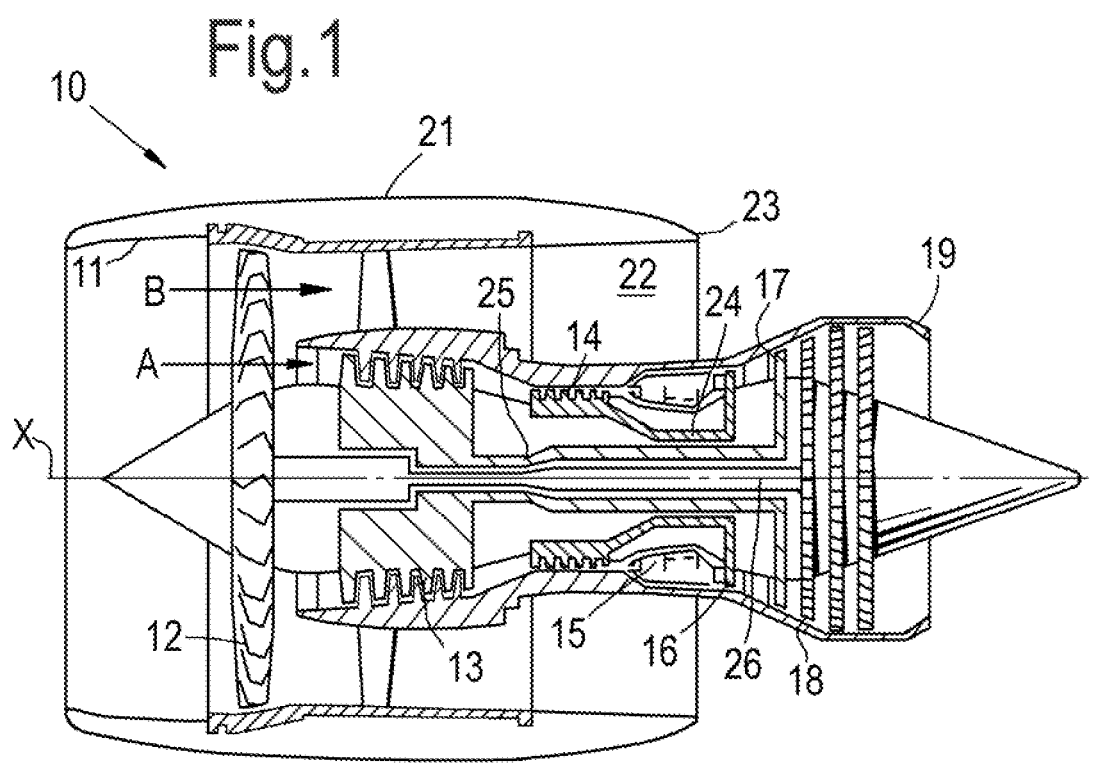
FIG. 1 is a sectional side view of a turbofan gas turbine engine having a combustion chamber arrangement according to the present disclosure.
Figure 2:
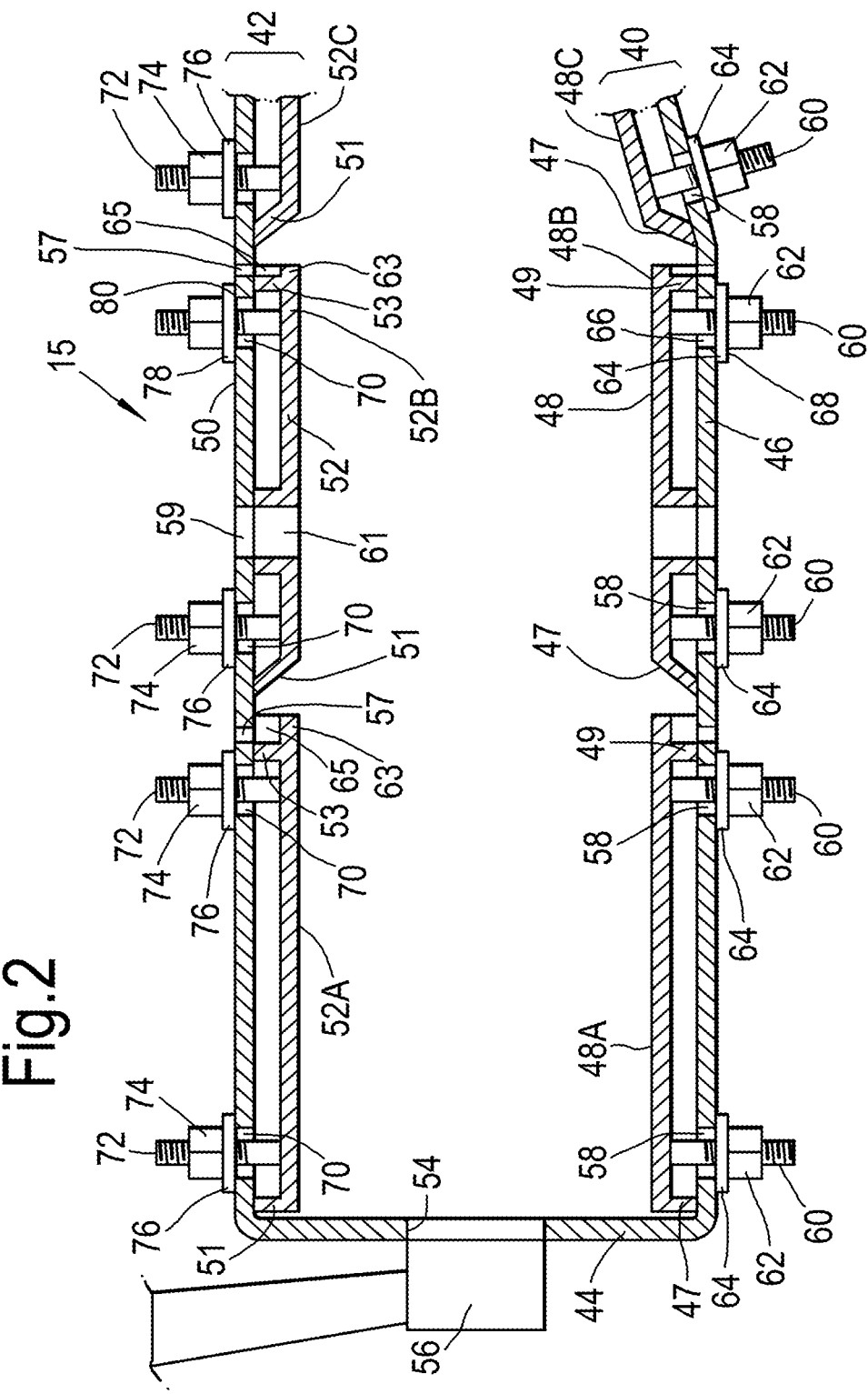
FIG. 2 is an enlarged cross-sectional view of a combustion chamber arrangement according to the present disclosure.

With reference to FIG. 1, a turbofan gas turbine engine is generally indicated at 10, having a principal and rotational axis X. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and an exhaust nozzle 19. A nacelle 21 generally surrounds the engine 10 and defines the intake 11, a bypass duct 22 and a bypass exhaust nozzle 23.

The gas turbine engine 10 works in the conventional manner so that air entering the intake 11 is compressed by the fan 12 to produce two air flows: a first air flow A into the intermediate pressure compressor 13 and a second air flow B which passes through a bypass duct 22 to provide propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high 16, intermediate 17 and low 18 pressure turbines drive respectively the high pressure compressor 14, intermediate pressure compressor 13 and fan 12, each by suitable interconnecting shaft 24, 25 and 26 respectively.

Figure 3:
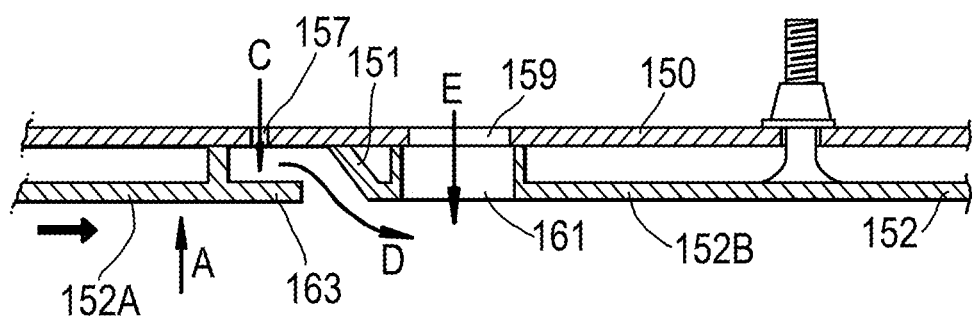
FIG. 3 is a further enlarged cross-sectional view of a portion of a combustion chamber arrangement not according to the present disclosure.
Figure 4:
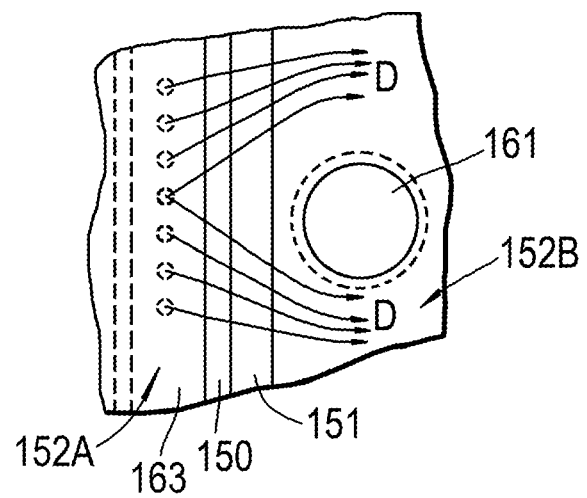
FIG. 4 is a view in the direction of arrow A in FIG. 3.
Figure 5:
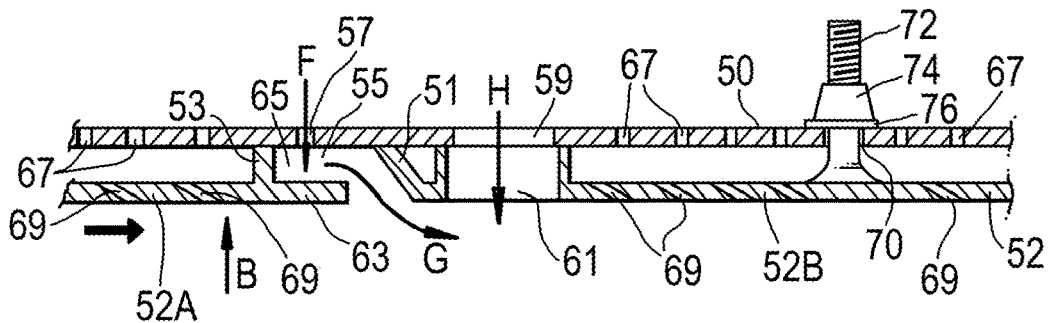
FIG. 5 is a further enlarged cross-sectional view of a portion of a combustion chamber arrangement according to the present disclosure.
Figure 6:
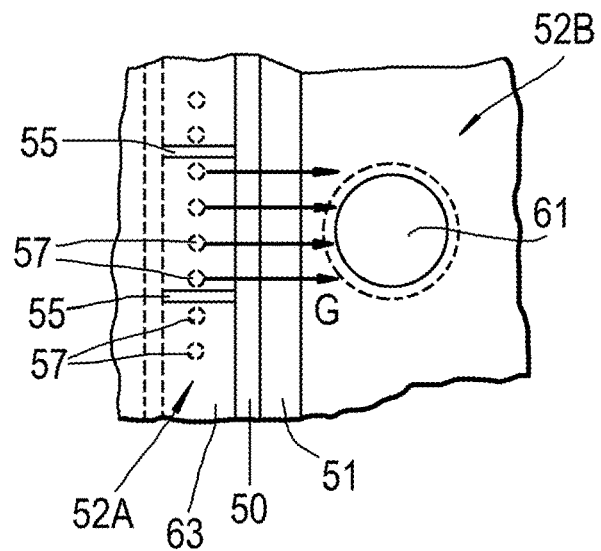
FIG. 6 is a view in the direction of arrow B in FIG. 5.
Figure 7:
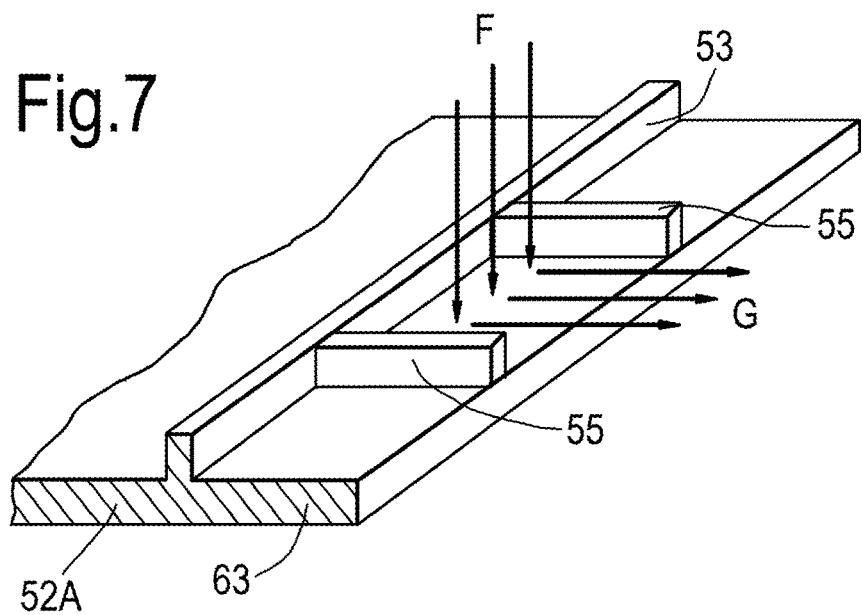
FIG. 7 is a perspective view of the downstream end of a tile used in a combustion chamber arrangement according to the present disclosure.

FIGS. 3 and 4 show a prior art combustion chamber arrangement which comprises an annular outer wall 150 and an annular inner wall 152 spaced radially from the annular outer wall 150. The annular inner wall 152 comprises a plurality of rows of circumferentially arranged tiles 152A and 152B. The downstream ends of the tiles 152A have lips 163 which extend axially towards but are spaced from the upstream ends of the adjacent row of tiles 1526 and the annular outer wall 150 has one or more rows of apertures 157 to direct coolant C onto the lips 163 and then to assist in re-forming a film of coolant D over the inner surface of the upstream ends 151 of the adjacent row of tiles 152B. The coolant D flows from the lips 163 of the tiles 152A after having provided impingement cooling of the lips 163 of the tiles 152A.

Dilution ports comprising aligned apertures 159 and 161 in the annular outer wall 150 and the tiles 152B of the annular inner wall 152. The low momentum flow of coolant D from the lips 163 of the tiles 152A combined with a local static pressure field upstream of the dilution ports 159 and 161 may lead to ingress, or flow reversal, into the space between the lips 163 of the tiles 152A and the annular outer wall 150. Hence, this may lead to overheating, and a reduction in the working life, of the downstream ends of the tiles 152A and the annular outer wall 150. The air E flowing through the dilution ports 159 and 161 has high momentum flow and disrupts the film of coolant flowing over the upstream ends 151 of the adjacent row of tiles 1526 produced by the coolant D flowing from the lips 163 at the downstream ends of the row of tiles 152A and causes the coolant flow D to migrate circumferentially around the dilution ports 159 and 161 leading to a region upstream of each dilution port 159 and 161 which is devoid of a coolant film. Hence, this may lead to overheating, and a reduction in the working life, of the upstream ends of the adjacent downstream row of tiles 1526.

Combustion equipment 15 according to the present disclosure, as shown more clearly in FIGS. 2, 5, 6 and 7, comprises an annular combustion chamber arrangement and comprises a radially inner annular wall structure 40, a radially outer annular wall structure 42 and an upstream end wall structure 44. The radially inner annular wall structure 40 comprises a first annular wall 46 and a second annular wall 48. The radially outer annular wall structure 42 comprises a third annular wall 50 and a fourth annular wall 52. The second annular wall 48 is spaced radially from and is arranged radially around the first annular wall 46 and the first annular wall 46 supports the second annular wall 48. The fourth annular wall 52 is spaced radially from and is arranged radially within the third annular wall 50 and the third annular wall 50 supports the fourth annular wall 52. The upstream end of the first annular wall 46 is secured to the upstream end wall structure 44 and the upstream end of the third annular wall 50 is secured to the upstream end wall structure 44. The upstream end wall structure 44 has a plurality of circumferentially spaced apertures 54 and each aperture 54 has a respective one of a plurality of fuel injectors 56 located therein. The fuel injectors 56 are arranged to supply fuel into the annular combustion chamber 15 during operation of the gas turbine engine 10.

The first annular wall 46 has a plurality of mounting apertures 58 extending there-though and the second annular wall 48 has a plurality of fasteners 60 extending radially there-from. Each fastener 60 on the second annular wall 48 extends radially through a corresponding mounting aperture 58 in the first annular wall 46. A cooperating fastener 62 locates on each of the fasteners 60 extending through the mounting apertures 58 in the first annular wall 46. A washer 64 is positioned between each fastener 60 on the second annular wall 48 and the cooperating fastener 62. Each washer 64 has a first surface 66 abutting an outer surface of the first annular wall 46 and a second surface 68 abutting a surface of the cooperating fastener 62. The second annular wall 48 comprises a plurality of segments, or tiles, 48A, 48B and 48C and the segments, or tiles, 48A, 48B and 48C are arranged circumferentially and axially around the first annular wall 46. The axially extending edges of adjacent segments, or tiles, 48A, 48B and/or 48B may abut each other or may overlap each other and the circumferentially extending ends of adjacent segments, or tiles, 48A, 48B and 48C are spaced from each other.

Similarly, the third annular wall 50 has a plurality of mounting apertures 70 extending there-though and the fourth annular wall 52 has a plurality of fasteners 72 extending radially there-from. Each fastener 72 on the fourth annular wall 52 extends radially through a corresponding mounting aperture 70 in the third annular wall 50. A cooperating fastener 74 locates on each of the fasteners 72 extending through the mounting apertures 70 in the third annular wall 50. A washer 76 is positioned between each fastener 72 on the fourth annular wall 52 and the cooperating fastener 74. Each washer 76 has a first surface 78 abutting an outer surface of the third annular wall 50 and a second surface 80 abutting a surface of the cooperating fastener 74. The fourth annular wall 52 comprises a plurality of segments, or tiles, 52A, 52B and 52C and the segments, or tiles, 52A, 52B and 52C are arranged circumferentially and axially adjacent to each other to define the fourth annular wall 52. The axially extending edges of adjacent segments, or tiles, 52A, 52B and/or 52C may abut each other or may overlap each other and the circumferentially extending ends of adjacent segments, or tiles, 52A, 52B and 52C are spaced from each other.

The fasteners 60 and 72 on the second and fourth annular walls 48 and 52 are threaded studs which are cast integrally with the segments, or tiles, 48A, 48B, 48C, 52A 52B and 52C or may be secured to the segments, or tiles, 48A, 48B, 48C, 52A, 52B and 52C by welding, brazing etc. Alternatively, the fasteners, e.g. threaded studs are formed by additive layer manufacturing integrally with the segments, or tiles 48A, 48B, 48C, 52A 52B and 52C. The cooperating fasteners 62 and 74 are nuts.

The first and third annular walls 46 and 50 form outer walls of the annular combustion chamber 15 and the second and fourth annular walls 48 and 52 form inner walls of the annular combustion chamber 15. The second annular wall 48 comprises at least one row of circumferentially arranged tiles and in this example there are three rows 48A, 48B and 48C of circumferentially arranged tiles and the tiles 48A form an axially upstream row of circumferentially arranged tiles and the tiles 48C form an axially downstream row of circumferentially arranged tiles. Similarly, the fourth annular wall 52 comprises at least one row of circumferentially arranged tiles and in this example there are three rows 52A, 52B and 52C of circumferentially arranged tiles and the tiles 52A form an axially upstream row of circumferentially arranged tiles, the tiles 52B form an axially intermediate row of circumferentially arranged tiles and the tiles 52C form an axially downstream row of circumferentially arranged tiles. The tiles 52A are an upstream row of tiles with respect to the tiles 52B and similarly the tiles 52B are a downstream row of tiles with respect to the tiles 52A. The tiles 52B are an upstream row of tiles with respect to the tiles 52C and similarly the tiles 52C are a downstream row of tiles with respect to the tiles 52B.

The combustion chamber arrangement also comprises a plurality of dilution ports in the radially inner annular wall structure 40 and a plurality of dilution ports in the radially outer annular wall structure 42. The dilution ports in the radially outer annular wall structure 42 comprises a plurality of aligned apertures 159 and 161 in the annular outer wall 50 and the tiles 152B of the annular inner wall 152. The dilution ports in the radially inner annular wall structure 40 comprise a plurality of aligned apertures in the annular outer wall 46 and the tiles 48B of the annular inner wall 48. The dilution ports supply dilution air H into the combustion chamber to control emissions.

The annular outer wall 50 has a plurality of impingement cooling apertures 67 extending there-through to direct coolant onto the outer surface of the tiles 52A, 52B and 52C and the tiles 52A, 52B and 52C have effusion cooling apertures 69 extending there-through to provide a film of coolant onto the inner surfaces of the tiles 52A, 52B and 52C respectively. The impingement cooling apertures 67 are generally arranged perpendicularly to the surfaces of the annular outer all 50 and the outer surfaces of the tiles 52A, 52B and 52C respectively. The effusion cooling apertures 69 are generally arranged at an acute angle, for example 30°, to the inner surfaces of the tiles 52A, 52B and 52C but other suitable angles may be used. Some effusion cooling apertures 69 may be arranged perpendicularly to the inner surfaces of the tiles 52A, 52B and 52C and some of the effusion cooling apertures 69 may be arranged at an acute angle, for example 30°, to the inner surfaces of the tiles 52A, 52B and 52C.

The downstream end of each tile 52A in the upstream row of tiles 52A has a rail 53 which extends from the outer surface of the tile 52A at the downstream end of the tile 52A towards and seals with an inner surface of the annular outer wall 50 and a lip 63 extends in a downstream direction towards but is spaced from the upstream ends of the tiles 52B in the downstream row of tiles 52B. The lip 63 extends from the junction between the rail 53 at the downstream end of the tile 52A and the main body of the tile 52A. The inner surface of the lip 63 forms a continuation of the inner surface of the main body of the tile 52A. The annular outer wall 50 has at least one row of apertures 57 to direct coolant F onto the outer surfaces of the lips 63 at the downstream ends of the tiles 52A in the upstream row of tiles 52A. The at least one row of apertures 57 is arranged to supply the coolant F to a chamber, e.g. an annular chamber, 65 defined between the inner surface of the annular outer wall 50, the rails 53 at the downstream ends of the tiles 52A and the lips 63 at the downstream ends of the tiles 52A in the upstream row of tiles 52A. The upstream end of each tile 52A in the upstream row of tiles 52A has a rail 51 which extends from the upstream end of the tile 52A towards and seals with the inner surface of the annular outer wall 50. Each tile 52A in the upstream row of tiles 52A also has rails (not shown) which extend axially along the circumferentially spaced edges and which also extend towards and seal against the inner surface of the annular outer wall 50 to form a closed chamber between each tile 52A and the annular outer wall 50. Thus, each tile 52A has rails which extend around the periphery of the tile 52A.

The downstream end of each tile 52B in the intermediate row of tiles 52B has a rail 53 which extends from the outer surface of the tile 52B at the downstream end of the tile 52B towards and seals with the inner surface of the annular outer wall 50 and a lip 63 extends in a downstream direction towards but is spaced from the upstream ends of the tiles 52C in the downstream row of tiles 52C. The lip 63 extends from the junction between the rail 53 at the downstream end of the tile 52B and the main body of the tile 52B. The inner surface of the lip 63 forms a continuation of the inner surface of the main body of the tile 52B. The annular outer wall 50 has at least one row of apertures 57 to direct coolant onto the outer surfaces of the lips 63 at the downstream ends of the tiles 52B in the intermediate row of tiles 52B. The at least one row of apertures 57 is arranged to supply the coolant to a chamber, e.g. an annular chamber, 65 defined between the inner surface of the annular outer wall 50, the rails 53 at the downstream ends of the tiles 52B and the lips 63 at the downstream ends of the tiles 52B in the intermediate row of tiles 52B. The upstream end of each tile 52B in the intermediate row of tiles 52B has a rail 51 which extends from the upstream end of the tile 52B towards and seals with the inner surface of the annular outer wall 50. The rail 51 at the upstream end of each tile 52B in the intermediate row of tiles 52B in this particular example also extends in an upstream direction. Each tile 52B in the intermediate row of tiles 52B also has rails (not shown) which extend axially along the circumferentially spaced edges and which also extend towards and seal against the inner surface of the annular outer wall 50 to form a closed chamber between each tile 52B and the annular outer wall 50. Thus, each tile 52B has rails which extend around the periphery of the tile 52B.

The downstream end of each tile 52C in the downstream row of tiles 52C has a rail (not shown) which extends from the outer surface of the tile 52C at the downstream end of the tile 52C towards and seals with the inner surface of the annular outer wall 50. The upstream end of each tile 52C in the downstream row of tiles 52C has a rail 51 which extends from the upstream end of the tile 52C towards and seals with the inner surface of the annular outer wall 50. The rail 51 at the upstream end of each tile 52C in the downstream row of tiles 52C in this particular example also extends in an upstream direction. Each tile 52C in the intermediate row of tiles 52C also has rails (not shown) which extend axially along the circumferentially spaced edges and which also extend towards and seal against the inner surface of the annular outer wall 50 to form a closed chamber between each tile 52C and the annular outer wall 50. Thus, each tile 52C has rails which extend around the periphery of the tile 52C. The tiles 52C in the downstream row of tiles 52C may have dilution apertures or may not have dilution apertures.

The downstream end of each of the tiles 52A in the upstream row of tiles 52A has a plurality of circumferentially spaced fences 55 which extend in a downstream direction from the rail 53. Each fence 55 extends from the outer surface of the lip 63 towards the inner surface of the annular outer wall 50. At least one of the apertures 57 in the at least one row of apertures 57 in the annular outer wall 50 is arranged to direct coolant F onto the lip 63 between two of the circumferentially adjacent fences 55. As shown a plurality of apertures 57, for example four, in the at least one row of apertures 57 in the annular outer wall 50 are arranged to direct coolant F onto the lip 63 between two circumferentially adjacent fences 55. Each fence 55 extends from the outer surface of the lip 63 towards and contacts the inner surface of the annular outer wall 50. Each fence 55 extends the full length, full axial length, of the lip 63. It is to be noted that each fence 55 extends with a purely axial component and does not extend with a circumferential component.

An upstream region of each tile 52B in the intermediate row of tiles 52B has at least one dilution aperture 61 and in this example has a plurality of circumferentially spaced dilution apertures 61. Each tile 52A in the upstream row of tiles 52A is arranged such that the, or each, dilution aperture 61 in a tile 52B in the intermediate row of tiles 52B is positioned circumferentially between two circumferentially adjacent fences 55 at the downstream end of the tile 52A in the upstream row of tiles 52A. Each tile 52A in the upstream row of tiles 52A is arranged in particular such that the, or each, dilution aperture 61 in a tile 52B in the intermediate row of tiles 52B is positioned circumferentially midway between two circumferentially adjacent fences 55 at the downstream end of the tile 52A in the upstream row of tiles 52A. The circumferential distance between two circumferentially adjacent fences 55 in the upstream row of tiles 52A is at least equal to the diameter of the dilution aperture 61 in the intermediate row of tiles 52B. In this example the circumferential distance between two circumferentially adjacent fences 55 on the upstream row of tiles 52A is greater than the diameter of the dilution aperture 61 in the intermediate row of tiles 52B. Each fence 55 on the upstream row of tiles 52A in this arrangement is positioned circumferentially between two circumferentially adjacent dilution apertures 61 in the intermediate row of tiles 52B. In this arrangement the number fences 55 at the downstream ends of the tiles in the upstream row of tiles 52A is equal to twice the number of dilution apertures 61 at the upstream ends of the in the intermediate row of tiles 52B. The fences 55 at the downstream ends of the tiles 52A direct the flow of coolant G in a predominantly axial direction over and across the rails 51 at the upstream ends of the tiles 52B and the inner surfaces of the tiles 52B.

The downstream end of each of the tiles 52B in the intermediate row of tiles 52A has a plurality of circumferentially spaced fences 55 which extend in a downstream direction from the rail 53. Each fence 55 extends from the outer surface of the lip 63 towards the inner surface of the annular outer wall 50. At least one of the apertures 57 in the at least one row of apertures 57 in the annular outer wall 50 is arranged to direct coolant F onto the lip 63 between two of the circumferentially adjacent fences 55. As shown a plurality of apertures 57, for example four, in the at least one row of apertures 57 in the annular outer wall 50 are arranged to direct coolant F onto the lip 63 between two circumferentially adjacent fences 55. Each fence 55 extends from the outer surface of the lip 63 towards and contacts the inner surface of the annular outer wall 50. Each fence 55 extends the full length, full axial length, of the lip 63. It is to be noted that each fence 55 extends with a purely axial component and does not extend with a circumferential component.

In operation the coolant F is directed with high velocity from the apertures 57 in the annular outer wall 50 to impinge upon the lips 63 at the downstream ends of the tiles 52A. The fences 55 on the outer surface of the tiles 52A control the flow of coolant G from the lips 63 of the tiles 52A such that the coolant G flows predominantly axially over and across the rails 51 at the upstream ends of the tiles 52B and across and over the upstream ends of the tiles 52B and in particular upstream of the dilution apertures 61 at the upstream ends of the tiles 52B with little or no circumferential directional component. This axial flow of coolant G reduces, or prevents, the ingress of hot gases into the chamber 65 defined between the rails 53 and lips 63 of the tiles 52A and the annular outer wall 50. The axial flow of coolant G also enables an effective film of coolant to be formed, or re-formed, on the inner surfaces of the tiles 52B in the regions of the tiles 52B immediately upstream of the dilution apertures 61 of the tiles 52B. This reduces the temperature of the upstream ends of the tiles 52B and the downstream ends of the tiles 52A and the temperature of the annular outer wall 50 between the rails 53 of the tiles 52A and the rails 51 of the tiles 52B.

Similarly, in operation the coolant F is directed with high velocity from the apertures 57 in the annular outer wall 50 to impinge upon the lips 63 at the downstream ends of the tiles 52B. The fences 55 on the outer surface of the tiles 52B control the flow of coolant G from the lips 63 of the tiles 52A such that the coolant G flows predominantly axially over and across the rails 51 at the upstream ends of the tiles 52C and across and over the upstream ends of the tiles 52C and in particular upstream of the dilution apertures 61 at the upstream ends of the tiles 52C with little or no circumferential directional component. This axial flow of coolant G reduces, or prevents, the ingress of hot gases into the chamber 65 defined between the rails 53 and lips 63 of the tiles 52B and the annular outer wall 50. The axial flow of coolant G also enables an effective film of coolant to be formed, or re-formed, on the inner surfaces of the tiles 52C. This reduces the temperature of the upstream ends of the tiles 52C and the downstream ends of the tiles 52B and the temperature of the annular outer wall 50 between the rails 53 of the tiles 52B and the rails 51 of the tiles 52C. It is to be noted that the tiles 52C do not have dilution apertures.

The tiles 48A, 48B and 48C and the annular outer wall 46 of the radially inner annular wall structure 40 are arranged in a similar manner to the annular outer wall 50 and the tiles 52A, 52B and 52C of the radially outer annular wall structure 42.

Each of the tiles 48A, 48B and 48C and each of the tiles 52A, 52B and 52C is parallelogram in shape in a plan view and in particular each of the tiles 48A, 48B and 48C and each of the tiles 52A, 52B and 52C is rectangular in a plan view. Each of the tiles 48A, 48B and 48C and each of the tiles 52A, 52B and 52C has longitudinally, axially, spaced ends and laterally, circumferentially, spaced edges. Each of the tiles 48A, 48B and 48C and each of the tiles 52A, 52B and 52C is arcuate and in particular is curved between its laterally spaced edges. Each of the tiles 48A, 48B and 48C has a rail extending around the periphery of a first surface, a radially inner surface, and the first surface is concave between its laterally spaced edges. Each of the tiles 52A, 52B and 52C has a rail extending around the periphery of a first surface, a radially outer surface, and the first surface is convex between its laterally spaced edges.

In another arrangement, not shown, each fence 55 at the downstream ends of the tiles in the upstream row of tiles 52A may be positioned circumferentially midway between two circumferentially adjacent dilution apertures 61 at the upstream ends of the tiles in the intermediate row of tiles 52B. In this arrangement the number of fences 55 at the downstream ends of the all of the tiles in the upstream row of tiles 52A is equal to the number of dilution apertures 61 at the upstream ends of all of the tiles in the intermediate row of tiles 52B.

The fences 55 on the downstream ends of the tiles 52A may be equally circumferentially spaced. Alternatively, the fences 55 on the downstream ends of the tiles 52A may be positioned circumferentially closer together in the regions immediately upstream of the dilution apertures 61 in the tiles 52B and be spaced further circumferentially apart in regions circumferentially between dilution apertures 61 in the tiles 52B.

FIG. 8 shows an arrangement in which the, or each, dilution aperture 61 at the upstream end of a tile 52B has three fences 55A, 55B and 55C positioned immediately upstream of it at the downstream end of a tile 52A in the upstream row of tiles 52A. The circumferential distance between the first and third fences 55A and 55C in the upstream row of tiles 52A is at least equal to the diameter of the dilution aperture 61 in the intermediate row of tiles 52B. In this example the circumferential distance between the first and third fences 55A and 55C on the upstream row of tiles 52A is greater than the diameter of the dilution aperture 61 in the intermediate row of tiles 52B. The second fence 55B is aligned circumferentially with the middle, circumferentially with respect to the combustion chamber 15, of the dilution aperture 61. The second fence 55B is positioned circumferentially midway between the first fence 55A and the third fence 55C. Two apertures 57 in the at least one row of apertures 57 in the annular outer wall 50 are arranged to direct coolant F onto the lip 63 between each pair of circumferentially adjacent fences 55, e.g. the first and second fences 55A and 55B and the second and third fences 55B and 55C. The circumferential distance between the first and second fences 55A and 55B is equal to the circumferential distance between the second and third fences 55B and 55C. The circumferential midway point between the first and third fences 55A and 55C is aligned circumferentially with the middle of the dilution aperture 61.

FIG. 9 shows an arrangement in which the, or each, dilution aperture 61 at the upstream end of a tile 52B has four fences 55D, 55E, 55F and 55G positioned immediately upstream of it at the downstream end of a tile 52A in the upstream row of tiles 52A. The circumferential distance between the first and fourth fences 55D and 55G in the upstream row of tiles 52A is at least equal to the diameter of the dilution aperture 61 in the intermediate row of tiles 52B. In this example the circumferential distance between the first and fourth fences 55D and 55G on the upstream row of tiles 52A is greater than the diameter of the dilution aperture 61 in the intermediate row of tiles 52B. One aperture 57 in the at least one row of apertures 57 in the annular outer wall 50 are arranged to direct coolant F onto the lip 63 between each pair of circumferentially adjacent fences 55, e.g. the first and second fences 55D and 55E, the second and third fences 55E and 55F and the third and fourth fences 55F and 55G. The circumferential distance between the first and second fences 55D and 55E, the circumferential distance between the second and third fences 55E and 55F and the circumferential distance between the third and fourth fences 55F and 55G are all equal. The circumferential midway point between the first and fourth fences 55D and 55G is aligned circumferentially with the middle of the dilution aperture 61.

FIG. 10 shows another arrangement of the fences at the downstream ends of the tiles 52A in the upstream row of tiles 52A. In this arrangement the fences 55 at the downstream ends of the tiles 52A in the upstream row of tiles 52A are positioned circumferentially closer together in the regions immediately upstream of the dilution apertures 61 at the upstream ends of the tiles 52B in the intermediate row of tiles 52B and are spaced further circumferentially apart in regions circumferentially between dilution apertures 61 at the upstream ends of the tiles 52B in the intermediate row of tiles 52B. The, or each, dilution aperture 61 at the upstream end of a tile 52B has five fences 55H, 55I, 55J, 55K and 55L positioned immediately upstream of it at the downstream end of a tile 52A in the upstream row of tiles 52A. The circumferential distance between the first and fifth fences 55H and 55L respectively in the upstream row of tiles 52A is at least equal to the diameter of the dilution aperture 61 in the intermediate row of tiles 52B. In this example the circumferential distance between the first and fifth fences 55H and 55K on the upstream row of tiles 52A is greater than the diameter of the dilution aperture 61 in the intermediate row of tiles 52B. The third fence 55J is aligned circumferentially with the middle, circumferentially with respect to the combustion chamber 15, of the dilution aperture 61. The third fence 55J is positioned circumferentially midway between the first fence 55H and the fifth fence 55L. The second and fourth fences 55I and 55K are positioned circumferentially midway between the first and third fences 55H and 55J respectively and the third and fifth fences 55J and 55L respectively. The second fence 55I is positioned circumferentially midway between the first fence 55H and the third fence 55J. The fourth fence 55K is positioned circumferentially midway between the third fence 55J and the fifth fence 55L. The circumferential distance between the first and second fences 55H and 55I, the circumferential distance between the second and third fences 55I and 55J, the circumferential distance between the third and fourth fences 55J and 55K and the circumferential distance between the fourth and fifth fences 55K and 55L are all equal. The circumferential midway point between the first and fifth fences 55H and 55L is aligned circumferentially with the middle of the dilution aperture 61.

As shown a single aperture 57 in the at least one row of apertures 57 in the annular outer wall 50 is arranged to direct coolant F onto the lip 63 between each pair of circumferentially adjacent fences, e.g. the first and second fences 55H and 55I, the second and third fences 55I and 55J, the third and fourth fences 55J and 55K and the fourth and fifth fences 55K and 55K. Each fence 55 extends from the outer surface of the lip 63 towards and contacts the inner surface of the annular outer wall 50. Each fence 55 extends the full length, full axial length, of the lip 63. It is to be noted that each fence 55 extends with a purely axial component and does not extend with a circumferential component.

In general in the arrangements the, or each, dilution aperture at the upstream end of a tile has three or more fences positioned immediately upstream of it at the downstream end of a tile in the upstream row of tiles. The circumferential distance between the first and last fences in the upstream row of tiles is at least equal to the diameter of the dilution aperture in the downstream row of tiles. The circumferential distance between the first and last fences on the upstream row of tiles may be greater than the diameter of the dilution aperture in the downstream row of tiles. The circumferential midway point between the first and last fences is aligned circumferentially with the middle of the dilution aperture in the downstream row of tiles. The remaining fences are positioned at equal circumferential distances apart between the first and last fences on the upstream row of tiles.

The dilution apertures at the upstream ends of the tiles in the row of tiles may have diameters in the range of 8 mm to 60 mm inclusive, the apertures in the annular outer wall may diameters in the range of 0.4 mm to 5 mm inclusive.

Although the present disclosure has referred to the downstream end of each tile in the upstream row of tiles having a plurality of circumferentially spaced fences extending in a downstream direction from the rail and each tile in the downstream row of tiles having a dilution aperture it may be equally possible to only provide a sufficient number of the tiles in the upstream row of tiles with fences to correspond with the number of tiles in the downstream row of tiles which have dilution apertures. An upstream region of a plurality of the tiles in the downstream row of tiles may have a dilution aperture and a plurality of tiles in the upstream row of tiles being arranged such that the dilution aperture in a respective one of the plurality of tiles in the downstream row of tiles is circumferentially positioned between two circumferentially adjacent fences at the downstream end of a respective one of the plurality of tiles in the upstream row of tiles. An upstream region of a single tile in the downstream row of tiles may have a dilution aperture and a single tile in the upstream row of tiles being arranged such that the dilution aperture is circumferentially positioned between two circumferentially adjacent fences at the downstream end of the single tile in the upstream row of tiles.

Although the present disclosure has referred to the downstream row of tiles having dilution apertures it is equally possible that the downstream row of tiles does not have any dilution aperture but a single tile of the downstream row of tiles may have an aperture for an igniter and a single tile of the upstream row of tiles has a plurality of circumferentially spaced fences and the single tile of the upstream row of tiles is arranged such that the igniter aperture in the single tile in the downstream row of tiles is circumferentially positioned between two circumferentially adjacent fences at the downstream end of the single tile in the upstream row of tiles.

However, it is preferred the downstream end of a plurality of the tiles in the upstream row of tiles may have a plurality of circumferentially spaced fences extending in a downstream direction from the rail, each fence extending from the outer surface of the lip towards the inner surface of the annular wall and at least one of the apertures in the at least one row of apertures in the annular outer wall is arranged to direct coolant onto the lip between two circumferentially adjacent fences.

An advantage of the present disclosure is that it provides a coolant flow from the lips of the tiles which is more axially directed. The present disclosure reduces, or prevents, the ingress of hot gases from the combustion chamber into the space defined between the rails and the lips at the downstream ends of the tiles and the annular outer wall. The present disclosure reduces the temperature of the upstream ends of the downstream row of tiles. The present disclosure reduces the temperature of the rails and lips at the downstream ends of the upstream row of tiles. The present disclosure reduces the temperature of the annular outer wall in the region between the rails at the downstream ends of the upstream row of tiles and the rails at the upstream ends of the downstream row of tiles. The present disclosure reduces the temperature of the upstream ends of the tiles upstream of the dilution apertures in the downstream row of tiles.

Although the present disclosure has referred to each fence extending from the outer surface and contacting the inner surface of the annular outer wall it may be equally possible for the fences to be spaced from the inner surface of the annular outer wall as long as the fences prevent circumferential flow of coolant between the fences and the inner surface of the annular outer wall. Although the present disclosure has referred to each fence extending the full axial length of the lip it may be equally possible for the fences to extend a portion of the full axial length of the lip. Although, the description has referred to the use of four apertures in the annular outer wall between two circumferentially adjacent fences on a tile, it is possible to use from one to nine apertures in the annular outer wall between two circumferentially adjacent fences on a tile.

Although the present disclosure has referred to the use of studs and nuts to secure the tiles to the particular supporting annular wall it may be possible to use bolts which are inserted through apertures in the tiles and respective apertures in the supporting annular wall and threaded into associated nuts or it may be possible to use threaded bosses on the tiles and bolts which are inserted through apertures in the supporting annular wall and into threaded into the respective bosses.

The combustion chamber is an annular combustion chamber and the annular inner wall is spaced radially inwardly from the annular outer wall.

The combustion chamber is an annular combustion chamber and the annular inner wall is spaced radially outwardly from the annular outer wall.

Although the present disclosure has referred to an annular combustion chamber is equally applicable to a tubular combustion chamber in which the annular inner wall is spaced radially inwardly from the annular outer wall.

The combustion chamber is a gas turbine engine combustion chamber.

The tiles may be made by casting or by additive layer manufacturing, e.g. direct laser deposition (DLD) or powder bed laser deposition. The tiles may comprise a nickel based superalloy, a cobalt based superalloy or an iron based superalloy.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A combustion chamber arrangement, comprising:
an annular outer wall; and
an annular inner wall spaced from the annular outer wall,
the annular inner wall comprising an upstream row of tiles and a downstream row of tiles, each row of tiles comprising a plurality of circumferentially arranged tiles, each tile in each row of tiles having an upstream end and a downstream end,
the downstream end of each tile in the upstream row of tiles having (i) a first rail extending from the downstream end of the tile towards and sealing with an inner surface of the annular outer wall and (ii) a lip extending in a downstream direction towards but spaced from the upstream ends of the tiles in the downstream row of tiles,
the upstream end of each tile in the downstream row of tiles having a second rail extending from the upstream end of the tile towards and sealing with an inner surface of the annular outer wall, an upstream region of at least one of the tiles in the downstream row of tiles having at least one of a dilution aperture and an igniter aperture,
the annular outer wall having at least one row of apertures to direct coolant onto outer surfaces of the lips at the downstream ends of the tiles in the upstream row of tiles, the at least one row of apertures being arranged to supply the coolant to a chamber defined between the inner surface of the annular outer wall, the first rails and the lips of the downstream ends of the tiles in the upstream row of tiles,
the downstream end of at least one of the tiles in the upstream row of tiles having a plurality of circumferentially spaced fences that extend in a downstream direction from the first rail and are spaced circumferentially from circumferentially spaced edges of the tile, each fence extending from the outer surface of the lip towards the inner surface of the annular outer wall, the at least one tile in the upstream row of tiles being arranged such that the at least one of the dilution aperture and the igniter aperture is positioned circumferentially between two circumferentially adjacent fences at the downstream end of the at least one tile in the upstream row of tiles, and at least one of the apertures in the at least one row of apertures in the annular outer wall is arranged so that an axis of the at least one aperture intersects the lip to direct coolant onto the lip between two circumferentially adjacent fences.

2. The combustion chamber arrangement as claimed in claim 1, wherein the at least one tile in the upstream row of tiles is arranged such that the dilution aperture or the igniter aperture is positioned circumferentially midway between two circumferentially adjacent fences at the downstream end of the tile in the upstream row of tiles.

3. The combustion chamber arrangement as claimed in claim 1, wherein:
the upstream region of the at least one tile in the downstream row of tiles has at least the dilution aperture, and
the circumferential distance between two circumferentially adjacent fences in the upstream row of tiles is at least equal to the diameter of the dilution aperture.

4. The combustion chamber arrangement as claimed in claim 1, wherein:
the upstream region of each of a plurality of the tiles in the downstream row of tiles has the dilution aperture or the igniter aperture, and
each one of the plurality of tiles in the upstream row of tiles is arranged such that the dilution aperture or the igniter aperture of a respective one of the plurality of tiles in the downstream row of tiles is positioned circumferentially between two circumferentially adjacent fences at the downstream end of the respective one of the plurality of tiles in the upstream row of tiles.

5. The combustion chamber arrangement as claimed in claim 4, wherein:
the upstream region of each of the plurality of the tiles in the downstream row of tiles has the dilution aperture,
each fence at the downstream ends of the tiles in the upstream row of tiles is positioned circumferentially midway between two circumferentially adjacent dilution apertures at the upstream regions of the tiles in the downstream row of tiles, and
the number of fences at the downstream ends of the tiles in the upstream row of tiles is equal to the number of dilution apertures at the upstream regions of the tiles in an intermediate row of tiles.

6. The combustion chamber as claimed in claim 1, wherein:
the upstream region of the at least one tile in the downstream row of tiles has at least the dilution aperture, and
the, or each, dilution aperture at the upstream region of a tile in the downstream row of tiles has at least three fences positioned immediately upstream thereof at the downstream end of a tile in the upstream row of tiles.

7. The combustion chamber arrangement as claimed in claim 6, wherein the circumferential distance between a first fence and a last fence on the tile of the upstream row of tiles is at least equal to the diameter of the dilution aperture in the downstream row of tiles.

8. The combustion chamber arrangement as claimed in claim 7, wherein:
the circumferential distance between the first and last fences on the tile of the upstream row of tiles is greater than the diameter of the dilution aperture in an intermediate row of tiles, and
the remaining fences are positioned at equal circumferential distances apart between the first and last fences.

9. The combustion chamber arrangement as claimed in claim 7, wherein the circumferential midway point between the first and last fences is aligned circumferentially with the middle of the dilution aperture in the downstream row of tiles.

10. The combustion chamber arrangement as claimed in claim 1, wherein a plurality of apertures in the at least one row of apertures in the annular outer wall are arranged to direct coolant onto the lip between two circumferentially adjacent fences.

11. The combustion chamber arrangement as claimed in claim 1, wherein each fence extends from the outer surface of the lip towards the inner surface of the annular outer wall and contacts the inner surface of the annular outer wall.

12. The combustion chamber arrangement as claimed in claim 1, wherein each fence extends in a downstream direction from the first rail, which extends the full length of the lip.

13. The combustion chamber arrangement as claimed in claim 1, wherein the second rail at the upstream end of each tile in the downstream row of tiles extends in an upstream direction.

14. The combustion chamber arrangement as claimed in claim 1, wherein the combustion chamber is an annular combustion chamber and the annular inner wall is spaced radially inwardly from the annular outer wall.

15. The combustion chamber arrangement as claimed in claim 1, wherein the combustion chamber is a tubular combustion chamber and the annular inner wall is spaced radially inwardly from the annular outer wall.

16. The combustion chamber arrangement as claimed in claim 1, wherein the combustion chamber is a gas turbine engine combustion chamber.

17. The combustion chamber arrangement as claimed in claim 1, wherein the lip at the downstream end of each tile in the upstream row of tiles extends from a junction between the first rail at the downstream end of the tile and a main body of the tile.

18. The combustion chamber arrangement as claimed in claim 1, wherein:
the upstream end of each tile in the upstream row of tiles has a third rail that extends from the upstream end of the tile towards and seals with the inner surface of the annular outer wall, and
each tile in the upstream row of tiles has fourth rails that extend axially along circumferentially spaced edges of the tile and that extend towards and seal against the inner surface of the annular outer wall to form a closed chamber between each tile and the annular outer wall.

19. The combustion chamber arrangement as claimed in claim 1, wherein the downstream ends of the tiles in the upstream row of tiles are located upstream of the upstream ends of the tiles in the downstream row of tiles.

* * * * *